UNITED STATES PATENT OFFICE.

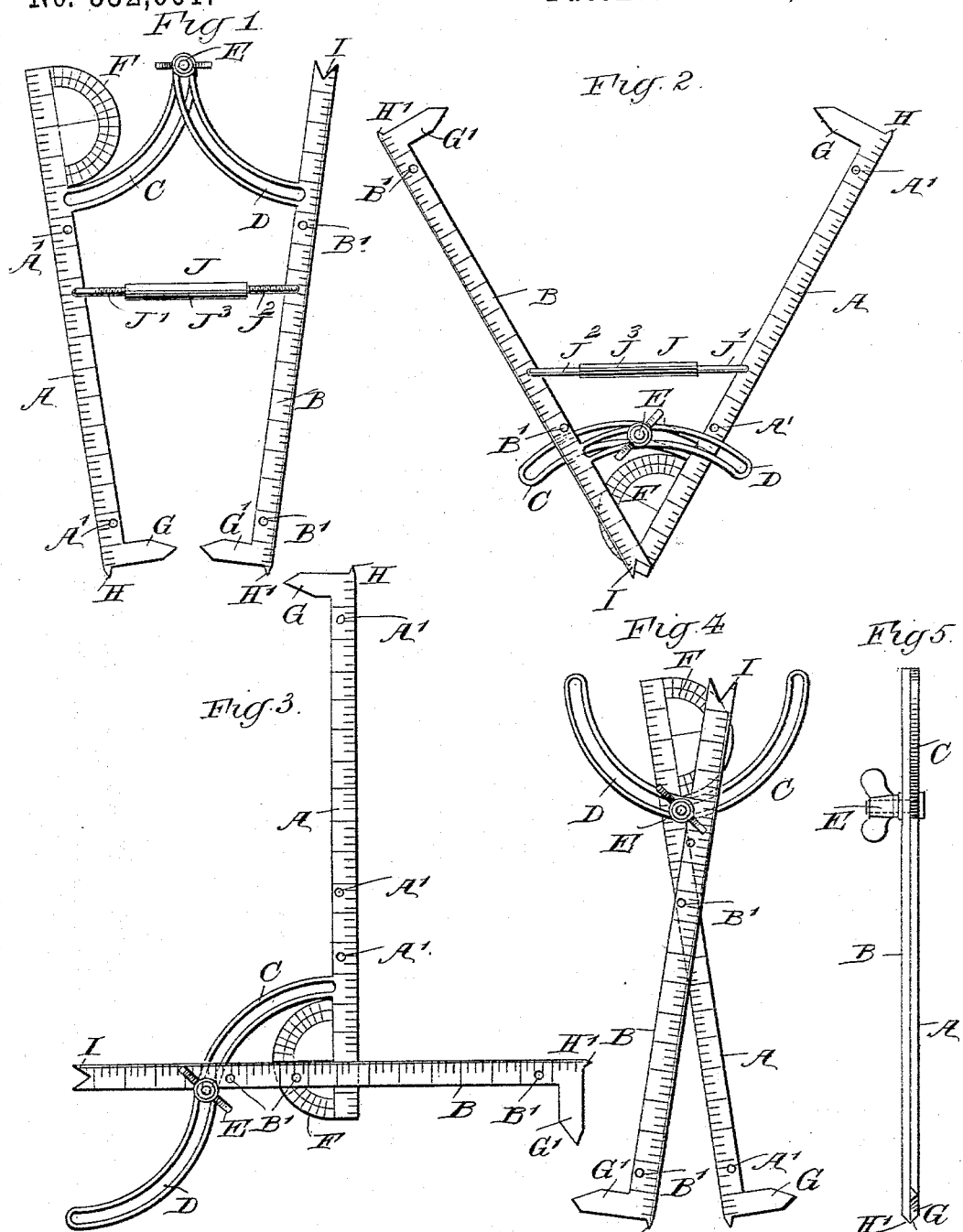

WILLIAM LINDEN, OF HELENA, MONTANA.

CALIPERS OR DIVIDERS.

SPECIFICATION forming part of Letters Patent No. 532,001, dated January 1, 1895.

Application filed January 9, 1894. Serial No. 496,230. (No model.)

*To all whom it may concern:*

Be it known that I, WILLIAM LINDEN, of Helena, in the county of Lewis and Clarke and State of Montana, have invented a new and Improved Measuring-Instrument, of which the following is a full, clear, and exact description.

The object of the invention is to provide a new and improved measuring instrument, which is simple and durable in construction, and arranged to permit of conveniently changing the several parts for use as a square, inside and outside calipers, taper and double gage, &c.

The invention consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a plan view of the improvement arranged as an outside caliper. Fig. 2 is a similar view of the same with the parts in a different position. Fig. 3 is a like view of the improvement arranged as a T-square. Fig. 4 is a similar view of the improvement arranged as an inside caliper. Fig. 5 is a side elevation of the improvement; and Fig. 6 is a side elevation of the adjusting link.

The improved measuring instrument is provided with the two legs A and B, preferably formed with a graduation representing linear measurement, as is plainly shown in the drawings. The legs A and B are provided with segmental, slotted arms C and D engaged by a bolt or screw E, serving to fasten the two arms together, so as to hold the legs in place after the proper adjustment has been made. The bolt or pin E forms a pivot for the legs, each leg being capable of independent movement on the said pivot.

On one end of the leg A is formed or secured a protractor F, having the usual degree scale, and on which indicates the other leg B, so as to enable the operator to move the legs A and B into a normal position relative to each other, according to the desired degree indicated on the protractor. On the opposite end of the leg A is formed an angular caliper point G, and a similar point G' is formed on the corresponding end of the other leg B. Near the caliper points G and G', and on the ends of the legs, are arranged the points H and H' respectively, for ordinary measurement.

On the end of the leg B, opposite the points G', H', is formed an angular recess, so as to form a center gage I, as is plainly shown in the drawings.

In order to adjust the legs A and B, and to hold the same securely in position after the adjustment is made, I provide an adjusting link J, comprising the screw threaded rods J' and $J^2$, having right and left hand screw threads, and screwing in a nut $J^3$, so that when the latter is turned in one direction the two rods J' and $J^2$ move inward simultaneously, and when the nut is turned in an opposite direction, the said rods J' and $J^2$ move simultaneously outward. The outer ends of the rods J' and $J^2$ are formed with lugs $J^4$ and $J^5$ respectively, formed to enter sets of apertures A', B' respectively, formed in the legs A and B respectively. Now, it will be seen that when the instrument is adjusted, say as an outside caliper, as shown in Figs. 1 and 2, then the operator, by turning the nut $J^3$, can readily move the legs A and B toward or from each other, so as to minutely adjust the caliper points G and G' on the object calipered. By adjusting the leg B on the protractor F, the said leg may be readily moved into a right angular position relative to the other leg A, so that the instrument forms a square, as is plainly shown in Fig. 3. By adjusting the leg B over the protractor F with the graduated edge of the leg B passing through the center of the protractor, the said legs can be set to any desired angle, the degree of which is indicated on the protractor F.

By swinging the legs A and B around the pivot E, as shown in Fig. 4, so that the segmental arms C and D stand away from each other, I am enabled to arrange the instrument as an inside caliper, as the caliper points G and G' then stand outward, as is plainly indicated in the said figure.

The instrument may also be used for various other purposes, such as taper or beveled gages, and it will only be necessary to swing the arms one over the other with the graduated edge of the leg B passing through the center of the protractor F to indicate on its graduation.

Having thus fully described my invention, I claim as new and desire to secure by Letters Patent—

1. A measuring instrument, comprising a pivot and two legs having slotted arms engaged by the said pivot, the legs having independent pivotal and sliding movement on the said pivot, and a protractor secured to one of the legs eccentrically to the pivot, substantially as described.

2. A measuring instrument comprising two legs having a sliding pivotal connection, a link connecting the legs intermediate the pivot and their ends, and means for varying the length of the said link, substantially as described.

3. A measuring instrument comprising two legs having segmental, slotted arms, a bolt for fastening the said arms together, caliper points on the said legs, and an adjusting link for connecting the legs with each other, substantially as shown and described.

4. A measuring instrument comprising two legs having segmental, slotted arms, means for fastening the said segmental, slotted arms together, and a protractor formed on one of the said legs, and on which is adapted to indicate the other leg, substantially as shown and described.

WILLIAM LINDEN.

Witnesses:
ALBERT ZIEGER,
C. W. FLEISCHER.